UNITED STATES PATENT OFFICE.

EMIL FISCHER, OF BERLIN, GERMANY, ASSIGNOR TO C. F. BOEHRINGER & SOEHNE, OF WALDHOF, GERMANY.

ALKYL-PURIN AND PROCESS OF MAKING SAME.

SPECIFICATION forming part of Letters Patent No. 617,985, dated January 17, 1899.

Application filed September 7, 1897. Serial No. 650,826. (Specimens.)

*To all whom it may concern:*

Be it known that I, EMIL FISCHER, a citizen of Germany, residing at Berlin, Germany, have invented certain new and useful Improvements in the Preparation of Alkylized Oxypurins; and I do hereby declare the following to be a full, clear, and exact description of the invention, such as will enable others skilled in the art to which it appertains to make and use the same.

This invention relates to the preparation of alkylized oxypurins, and more particularly the synthetical production of heteroxanthin, paraxanthin, and methylized hypoxanthins, all of which have been recognized as methylized oxypurins as a result of recent investigations. So far as I am aware these bodies have hitherto been obtained only as secretions formed in the animal organism. No one has hitherto produced them artificially or synthetically.

Heteroxanthin, as a result of the researches of Krüger and Salomon, has been recognized as monomethyl-xanthin. (See *Zeitschrift für Physiologische Chemie*, Vol. 21, page 169.) As to paraxanthin it was conjectured that the same was identical with the last of the dimethyl-xanthins. However, no direct proof existed for this supposition. The constitution of hypoxanthin was still less understood.

I have discovered methods of producing both heteroxanthin and paraxanthin, as well as dimethyl-hypoxanthin described by Krüger, and, finally, the hitherto unknown body monomethyl-hypoxanthin from theobromin. My invention consists in these methods and such other features, subprocesses, and compounds as will be hereinafter set forth, and pointed out in the claims.

In explaining my invention the nomenclature recently proposed by me (*Sitzungs Berichte der Konigl, Preussischen Akademie* 1897, No. 1, Jan. 8, 1897, and *Berichte der Deutschen Chemischen Gesellschaft*, Vol. 30, No. 5, page 557) and the structural formulæ, as the result of the most recent investigations, will be adopted. According to this nomenclature the various atoms of the purin molecule which forms the basis of the uric acid and xanthin molecules and many others are numbered as follows:

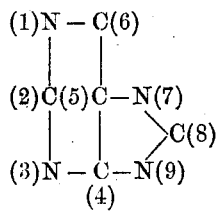

Bearing these numerals and their relative positions in mind, the designations of the equivalent terms hereinafter used in connection with heteroxanthin, paraxanthin, and the hypoxanthins will be apparent and readily understood. The structural formulæ and consequent additional designations which may be applied to these compounds are as follows:

First. Heteroxanthin or 7-methyl-xanthin or 7-methyl-2-6-dioxypurin

Second. Paraxanthin or 1-7-dimethyl-xanthin or 1-7-dimethyl-2-6-dioxypurin

Third. 7-methyl-hypoxanthin or 7-methyl-6-oxypurin

Fourth. 1-7-dimethyl-hypoxanthin or 1-7-dimethyl-6-oxypurin

In preparing these bodies I start from theobromin, which is the same as 3-7-dimethylxanthins of 3-7-dimethyl-2-6-dioxypurin and whose formula is:

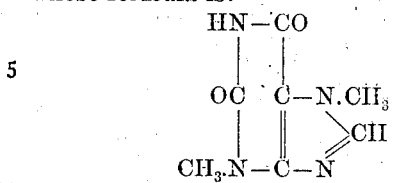

treating the same with a phosphorous-oxy-halogen compound, such as phosphorous oxychlorid. Under this treatment the oxygen atoms are replaced by chlorin and one methyl radical is split off, the resultant body being 7-methyl-2-6-dichloropurin:

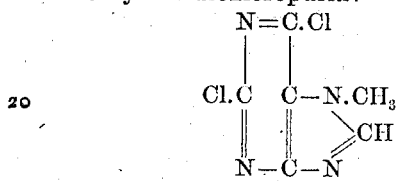

The two chlorin atoms of this new body, methyl-dichloropurin, are very mobile. They may be eliminated and replaced by hydroxyl simultaneously or separately. This substitution gives rise to the following reactions, which are intimately related and which lead to the four above-mentioned compounds:

First. 7-methyl-dichloropurin being heated together with hydrochloric acid loses both chlorin atoms and is converted into heteroxanthin:

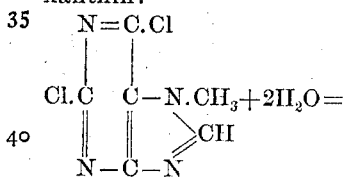

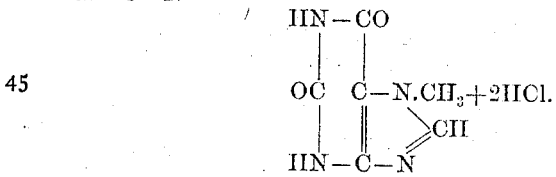

Second. 7-methyl-dichloropurin on being treated with alkali exchanges only one chlorin atom for hydroxyl, 7-methyl-6-oxy-2-chloropurin being obtained:

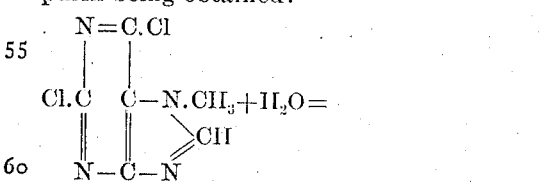

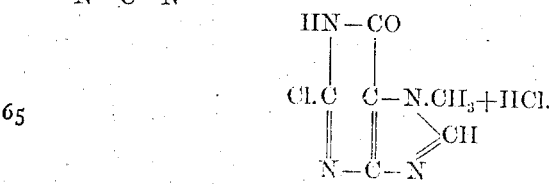

Third. 7-methyl-6-oxy-2-dichloropurin will readily take up an alkyl radical in the imido group. For example, when subjecting the same to methylation it yields 1-7-dimethyl-6-oxy-2-chloropurin, thus:

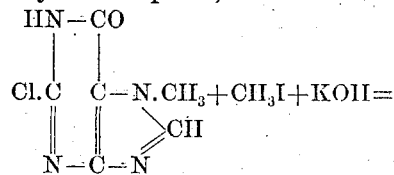

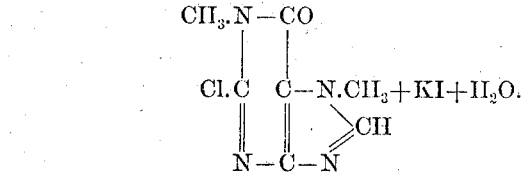

Fourth. 1-7-dimethyl-6-oxy-2-chloropurin is converted into paraxanthin by heating it with hydrochloric acid:

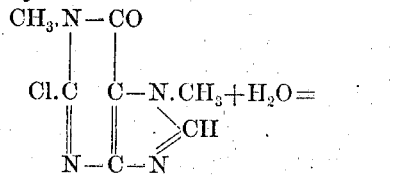

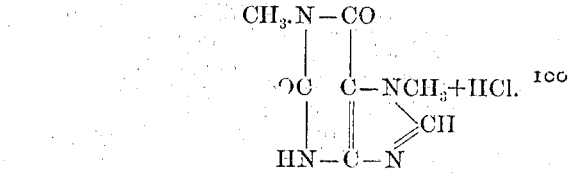

Fifth. 7-methyl-6-oxy-2-chloropurin is converted into 7 methyl-hypoxanthin by a reducing agent, such as hydriodic acid:

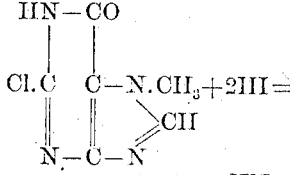

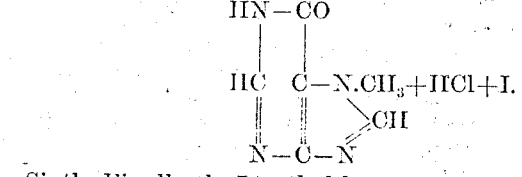

Sixth. Finally, the 7-methyl-hypoxanthin or 7-methyl-6-oxypurin may by further methylation be converted into the dimethyl-hypoxanthin, which has been prepared from natural hypoxanthin by Krüger.

In the detailed description which is now to follow I will divide the subject-matter into four heads, proceeding in the order above given— that is to say, giving a disclosure, first, of the method under my invention of preparing the 7-methyl-2-6-dichloropurin, the starting product for all the processes subsequently set forth; secondly, of the method of preparing heteroxanthin; thirdly, of the method of preparing paraxanthin, and, fourthly, the method of preparing the methylized hypoxanthins.

The proportions hereinafter given are all understood to be by weight.

*First. Preparation of 7-methyl-2-6-dichloropurin.*—I take ten parts of theobromin and heat the same under pressure—e. g., in a digester—together with one hundred parts of phosphorous oxychlorid, to a temperature of 140° centigrade, this temperature being maintained for three hours and the mass constantly agitated. A clear liquid having a pale-brown color results. From this liquid the remaining phosphorous oxychlorid is removed by distilling *in vacuo*. One hundred and fifty parts of cold water having a temperature of between 0° and 5° centigrade, preferably, are then poured over the amorphous residue. Under this treatment the mass is gradually converted into almost-colorless crystals. This change is hastened by shaking. The generation of heat in the mass is obviated by cooling with ice or other refrigerant agency. The mass after having been finally cooled thoroughly is put on the filter and washed with ice-water. The crude product so obtained is contaminated with a substance which is soluble in alkali. The same is hence dissolved out with an alkaline solution, preferably very dilute soda-lye of about one per cent. strength. The solid residue is then drained on a filter and well washed thereon and redissolved in hot water and recrystallized therefrom. The new compound, 7-methyl-2-6-dichloropurin, so obtained crystallizes in fine colorless needles, which melt at about 196° to 197° centigrade. It is soluble with difficulty in cold water and soluble in about seventy parts hot water and in about thirty parts boiling alcohol. Its composition is indicated by the formula $C_6H_4N_4Cl_2$ or the structural formula:

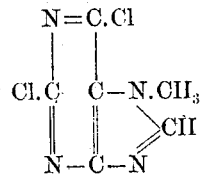

The reaction taking place in preparing the same from theobromin is indicated in the equation:

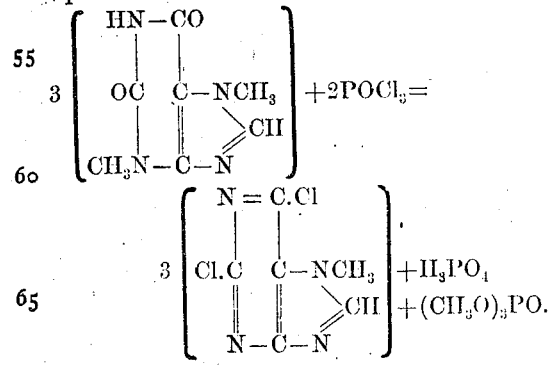

*Second. Preparation of heteroxanthin.*—I take one part of 7-methyl-2-6-dichloropurin and heat the same under pressure—e. g., in a pressure-tube—together with ten parts of hydrochloric acid of the specific gravity 1.19, to from 120° to 125° centigrade, maintaining this temperature for three hours. A clear faintly-colored solution results, which on being evaporated to dryness on the water-bath leaves the hydrochlorate of the paraxanthin or methyl-xanthin in the shape of coarse prismatic crystals. The reaction takes place according to the following equation:

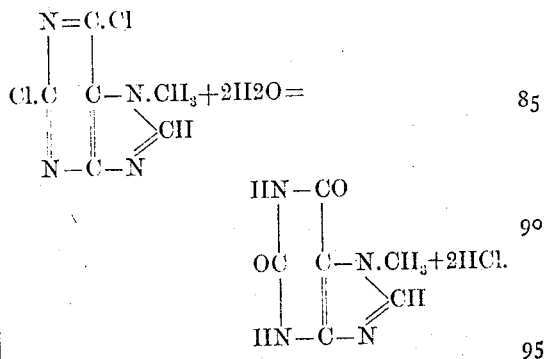

To liberate the base heteroxanthin dilute ammonia is poured over these crystals in sufficient or more than sufficient quantity to combine with all of the HCl. Any excess of ammonia is removed by evaporation. The difficultly-soluble base is then drained on the filter and redissolved in hot water, the solution being then allowed to cool. The base is thus obtained as a colorless indistinctly-crystalline powder. To obtain the base in an absolutely pure condition, it is purified by first preparing the sodium salt which forms good crystals.

The heteroxanthin or 7-methyl-xanthin or 7-methyl-2-6-dioxypurin coincides in most respects with the heteroxanthin which has been investigated and described by Krüger and Salomon, (*Zeitschrift für Physiologische Chemie*, Vol. 21, page 169,) as well as Bondzynski and Gottlieb, (*Berichte der Deutschen Chemischen Gesellschaft*, Vol. 28, 1895, page 1113, and *Archiv. für Experimentale Pathologie und Pharmazie*, Vol. 37, page 385.) A difference was, however, observed with regard to the melting-point and the solubility of the base in water, the varying data found by the former investigations being due to the impurity of the ingredients or reagents employed.

I find that pure heteroxanthin has no fixed melting-point, but begins to soften when heated to over 360° centigrade and melts at about 380° centigrade, this change being accompanied by a darkening of the compound and the evolution of gases. One hundred and forty-two parts, by weight, of boiling water are required to dissolve one part of heteroxanthin.

*Third. Preparation of paraxanthin.*—This process comprises three subprocesses, involving the preparation of two new compounds first prepared and discovered by me. These subprocesses, stated in the order in which they are carried out, are (a) the preparation of 7-methyl-6-oxy-2-chloropurin, (b) the preparation of 1-7-dimethyl-6-oxy-2-chloropurin, and (c) conversion of the latter into paraxanthin.

(a) *Preparation of 7-methyl-6-oxy-2-chloropurin.*—Ten parts of finely-pulverized 7-methyl-2-6-dichloropurin, which has been described under the first head, are suspended in one hundred parts of boiling water and a quantity of soda-lye sufficient to furnish two molecules of the alkali for each molecule of the methyl-dichloropurin. The mass is then stirred until a clear solution is formed, whereby the end of the process is indicated. The reaction takes place according to the following equation:

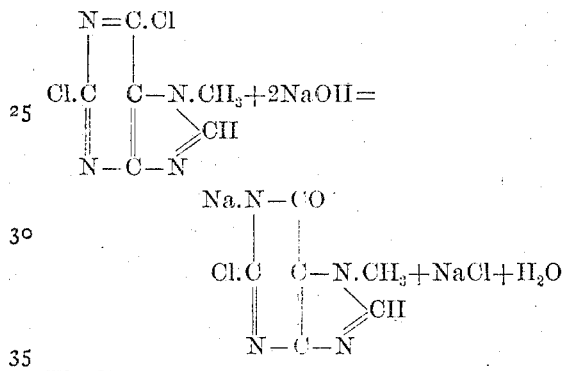

The liquid is then cooled and the same is then supersaturated with acetic acid, whereby the methyl-oxypurin is precipitated in crystalline form. This precipitate after being separated is boiled in one hundred and fifty parts of water, and after boiling it is filtered and the filtrate allowed to cool, when the new product will be thrown down in the form of columnar crystals of a pale-yellow color. To completely purify the product, it is first converted into its barium salt, which forms fine crystals, and then reconverted into the methyl-oxychloropurin by redissolving the barium salt in fifty to sixty parts of hot water and supersaturating with acetic acid. The analysis of the new product shows that its formula is $C_6H_5N_4OCl$ and that its structure corresponds to the formula:

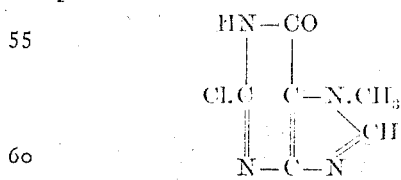

Pure methyl-oxychloropurin attains a yellow color when heated to about 310° centigrade. At a higher temperature its color becomes more and more dark, this darkening being attended by continuing decomposition. It dissolves in about one hundred and fifty parts of boiling water and in about two hundred and fifty parts of boiling alcohol.

(b) *Preparation of 1-7-dimethyl-6-oxy-2-chloropurin.*—I take five parts of the 7-methyl-6-oxy-2-chloropurin just described and dissolve them in thirty-two parts normal potassium-lye, (5.6 per cent. strength,) and five parts methyl iodid are then added to the solution. The mixture is then heated in a closed vessel to from about 80° to 90° centigrade. This heat is maintained for about three-fourths of an hour, after the lapse of which time the methylation is completed. This process proceeds in accordance with the equation:

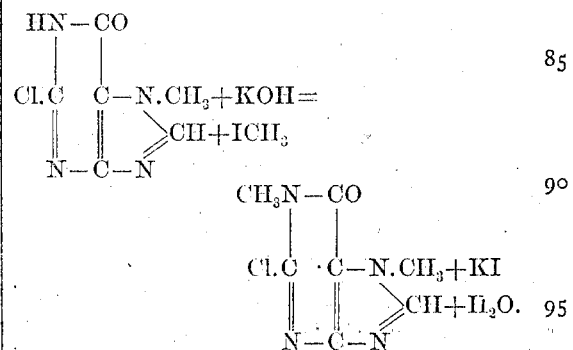

On cooling, the new dimethyl compound separates from the liquor in the form of fine white acicular crystals. These crystals are then recrystallized from water for the purpose of further purification. An analysis of the pure compound gives figures corresponding to the formula $C_7H_7N_4OCl$. Its structural formula is found to be:

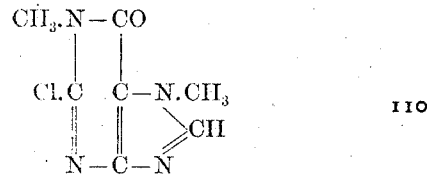

1-7-dimethyl-6-oxy-2-chloropurin melts at about 270° centigrade, the melting being, however, attended by decomposition. It is soluble in about fifty parts boiling water. It is not soluble in dilute alkalies, but soluble in concentrated hydrochloric acid.

(c) *Conversion of 1-7-dimethyl-6-oxy-2-chloropurin into paraxanthin.*—One part of the 1-7-dimethyl-6-oxy-2-chloropurin, together with ten parts of concentrated hydrochloric acid of the specific gravity 1.19, is heated to from 125° to 130° centigrade under pressure—e. g., in a digester. This temperature is maintained for from two to three hours. A clear solution results, and this is evaporated to dryness. The residue is crude paraxanthin, which is best purified by first converting it into its sodium salt, which is soluble with difficulty, and then liberating the paraxanthin by redissolving the sodium salt in hot water and supersaturating with acetic acid. The reaction proceeds according to the equation:

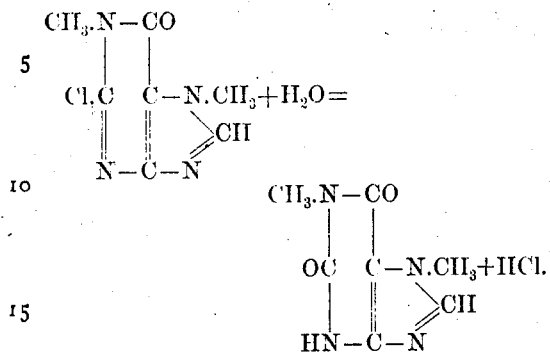

The analysis of the pure product thus obtained gives figures corresponding to the formula $C_7H_8N_4O_2$ or the structural formula hereinabove given. The product thus synthetically produced is identical with the natural compound paraxanthin. Its melting-point is 295° to 296° centigrade. It is soluble in about twenty-four parts of hot water, and on rapidly cooling such solution it crystallizes therefrom in the form of fine flexible needles. It forms a sodium salt which is difficultly soluble in an excess of cold soda-lye.

*Fourth. Preparation of 7-methyl-hypoxanthin.*—One part of 7-methyl-6-oxy-2-chloropurin, which has been hereinabove described, is mixed with eight parts of colorless hydriodic acid of the specific gravity 1.96 by pouring the latter over the former. It is then heated to from 60° to 70° centigrade, after having first added a half part of phosphonium iodid, and maintained at this temperature and frequently shaken until a clear colorless solution results. The liquid is then evaporated, when the hydriodate of the 7-methyl-hypoxanthin or 7-methyl-6-oxypurin remains as a colorless crystalline mass, which is readily soluble in water. The reaction proceeds according to the equation:

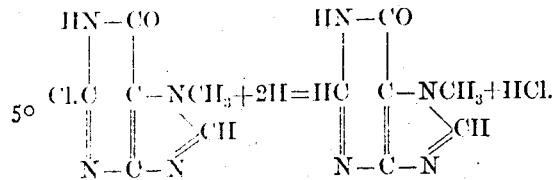

This new base, methyl-hypoxanthin, is liberated from the above salt by dissolving the latter in water and boiling the same, then adding carbonate of lead to the boiling solution, and then filtering. Any traces or small quantities of lead remaining in the filtrate are then thrown out by means of hydrosulfuric acid, and the liquid is again filtered, after which the filtrate is evaporated to dryness. The residue is methyl-hypoxanthin and forms a colorless crystalline mass, which is redissolved in and crystallized from alcohol for the purpose of purification. It is thus obtained in the form of fine colorless needles. Its analysis shows that its constitution corresponds to the formula $C_6H_6N_4O$. Its structural formula is:

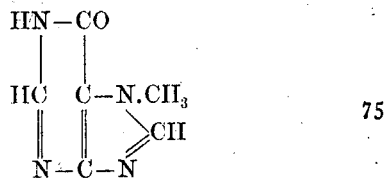

Methyl-hypoxanthin when rapidly heated assumes a brown color at about 340° centigrade and melts at about 353° centigrade. The melting-point, however, is not quite fixed. It is readily soluble in water. On adding nitrate of silver to an aqueous solution of the same a white precipitate is formed, which on being dissolved in warm dilute nitric acid is obtained as a white crystalline powder.

*Fifth. Preparation of 1-7-dimethyl-hypoxanthin.*—Two parts of 7-methyl-hypoxanthin, which has been described, are mixed with twenty parts of water, twenty parts of methyl alcohol, two parts of methyl iodid, and 0.3 parts of sodium dissolved into methyl alcohol, (a quantity sufficient to replace the hydrogen represented by the one imido group in the formula of 7-methyl-hypoxanthin.) The mixture is then heated in a closed vessel to from 75° to 80° centigrade, this temperature being maintained for three hours. The resulting liquid is then highly concentrated and allowed to cool. On cooling, the sodium-iodin compound of 1-7-dimethylxanthin, which has been described by Krüger, (*Berichte der Deutschen Chemischen Gesellschaft*, Vol. 26, page 1921,) and having the formula:

$$C_7H_8N_4O.NaI+3\ aqu.$$

is separated from the liquid in the form of needles. The base is separated from the sodium-iodin compound by dissolving in water and shaking with oxid of silver. After filtration of the iodid of silver the solution is evaporated and the base is then extracted therefrom with chloroform. After the solvent has evaporated the dimethyl-hypoxanthin remains as a cystalline mass in the form of fine needles. The former process proceeds according to the equation:

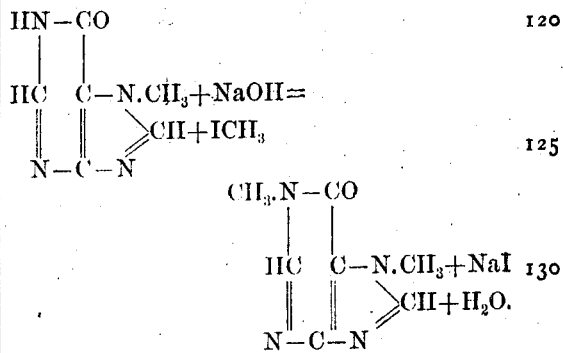

Dimethyl-hypoxanthin begins to soften at about 243° centigrade and melts at 247° centigrade, without decomposition. Heated in small quantities it distils over without decomposition for the greater portion. From hot alcohol it crystallizes in the form of fine needles, which for the most part are massed together. In other respects this base is distinguished by the characteristic properties set forth by Krüger.

While I have herein described the process of preparing heteroxanthin or 7-methyl-2-6-dioxypurin from 7-methyl-2-6-dichloropurin or indirectly from theobromin in illustration of my invention, I do not claim herein the same, since the same is made the subject-matter of my concurrent application, Serial No. 665,462, filed January 3, 1898, (No. 21;) nor do I in this application lay claim to the new compound 7-methyl-hypoxanthin or 7-methyl-6-oxypurin and the process of preparing the same and of converting the same into 1-7-dimethyl-hypoxanthin or 1-7-dimethyl-6-oxypurin, since said new compound and processes form the subject-matter of my concurrent application, Serial No. 665,463, filed January 3, 1898, (No. 22,) and are herein described only in illustration of my invention.

What I claim, and desire to secure by Letters Patent of the United States, is—

1. The method of preparing 7-methyl-2-6-dichloropurin which consists in treating theobromin with an oxyhalogen compound of phosphorus.

2. The method of preparing 7-methyl-2-6-dichloropurin which consists in heating theobromin with phosphorous oxychlorid.

3. The method of preparing 7-methyl-2-6-dichloropurin which consists in heating theobromin together with phosphorous oxychlorid under pressure, substantially in the proportions and at the temperature stated, then removing the excess of phosphorous oxychlorid and adding water to the residue.

4. The method of preparing 7-methyl-2-6-dichloropurin which consists in heating theobromin together with phosphorous oxychlorid under pressure substantially in the proportion and at the temperature stated, then removing the excess of phosphorous oxychlorid and adding water to the residue, and then treating with alkali and filtering and washing the residue and finally redissolving in hot water and allowing to crystallize.

5. The method of preparing 7-methyl-2-6-dichloropurin which consists in heating theobromin together with phosphorous oxychlorid under pressure substantially in the proportion and at the temperature stated, then removing the excess of phosphorous oxychlorid and adding water to the residue, then treating with dilute soda-lye.

6. As a new chemical compound, 7-methyl-2-6-dichloropurin, having the formula above given and having the following properties: it crystallizes in fine colorless needles, which melt at about 196° to 197°, centigrade; it is difficulty soluble in cold water and dissolves in about thirty parts boiling alcohol and seventy parts hot water.

7. In the art of preparing methylized oxypurins, the process which consists in treating 7-methyl-2-6-dichloropurin with an alkali.

8. The process which consists in heating 7-methyl-2-6-dichloropurin with dilute alkali.

9. The process which consists in suspending pulverized 7-methyl-2-6-dichloropurin in boiling water and adding thereto soda-lye.

10. The process which consists in suspending pulverized 7-methyl-2-6-dichloropurin in boiling water and adding thereto soda-lye, agitating the mixture and then throwing out the methyl-oxychloropurin by an acid such as acetic acid.

11. The process in the manufacture of paraxanthin which consists in treating 7-methyl-6-oxy-2-chloropurin with a methylating agent.

12. The process which consists in treating 7-methyl-6-oxy-2-chloropurin with an alkali together with methyl iodid.

13. The process which consists in dissolving 7-methyl-6-oxy-2-chloropurin in potash-lye and adding methyl iodid and heating the mixture, substantially as described.

14. The process which consists in treating 1-7-dimethyl-6-oxy-2-chloropurin with a mineral acid, whereby the same is converted into paraxanthin.

15. The process which consists in heating 1-7-dimethyl-6-oxy-2-chloropurin with hydrochloric acid, for the purpose of converting the same into paraxanthin.

16. The process which consists in heating under pressure 1-7-dimethyl-6-oxy-2-chloropurin together with concentrated hydrochloric acid.

17. The process which consists in heating under pressure 1-7-dimethyl-6-oxy-2-chloropurin together with concentrated hydrochloric acid and then purifying the paraxanthin by converting it into its soda-salt.

18. The process for the preparation of paraxanthin which consists in treating 7-methyl-2-6-dichloropurin with an alkali then isolating the resultant 7-methyl-6-oxy-2-chloropurin and methylating same, then isolating the resultant 1-7-dimethyl-6-oxy-2-chloropurin and treating the same with a mineral acid.

19. The process for the preparation of paraxanthin which consists in treating theobromin with a phosphorous halogen compound and isolating the resultant 7-methyl-2-6-dichloropurin, then treating the latter with an alkali and isolating the resultant 7-methyl-6-oxy-2-chloropurin, then methylating the latter and isolating the resultant 1-7-dimethyl-6-oxy-2-chloropurin and finally treating the latter compound with a mineral acid.

In testimony whereof I have affixed my signature in presence of two witnesses.

EMIL FISCHER.

Witnesses:
LORENZ ADS,
FR. ADS.